(No Model.)
E. D. CROSS.
GALVANIC BATTERY.
No. 397,969. Patented Feb. 19, 1889.
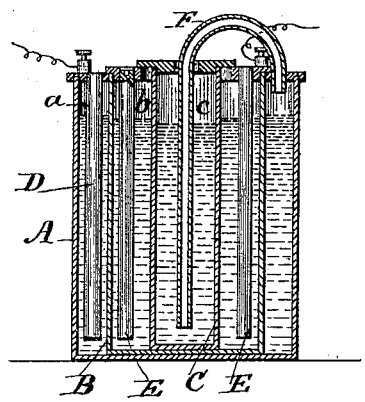
ATTEST—
Harry L. Amer.
E. E. Masson
INVENTOR—
Eben D. Cross
by Chas. G. Page
atty

UNITED STATES PATENT OFFICE.

EBEN D. CROSS, OF CHICAGO, ILLINOIS.

GALVANIC BATTERY.

SPECIFICATION forming part of Letters Patent No. 397,969, dated February 19, 1889.

Application filed December 10, 1888. Serial No. 293,216. (No model.)

*To all whom it may concern:*

Be it known that I, EBEN DICKEY CROSS, a citizen of the United States, residing at Chicago, in the county of Cook and State of Illinois, have invented a certain new and useful Improvement in Galvanic Batteries, of which the following is a specification.

The principal object of my invention is to prolong the life of the battery, a further object being to prevent the escape of noxious fumes.

To the attainment of the foregoing and other useful ends, I provide a three-cell battery, whereof one cell is employed as a supply-cell, while the two remaining cells are respectively employed for containing the positive and negative electrodes and suitable excitants therefor. The supply-cell contains a suitable quantity of fluid, which is to be charged or impregnated with fumes from one of the two cells that contain the electrodes, as aforesaid, and as a means for thus charging the fluid within the supply-cell I provide the battery with a fume-conducting passage arranged to receive and conduct off the fumes from the upper portion of one of the said two cells that contain the electrodes and to discharge such fumes at a suitable depth within the supply-cell. The fumes, in place, therefore, of escaping from the cell wherein they are generated by the action of some desirably-powerful excitant upon the electrode, are conducted to and discharged within the supply-cell, wherein said fumes will charge the liquid therein, and hence save the fumes and produce within the supply-cell an excitant. I have found by practical experiment that while the fluid-excitant in the cell from which the fumes are led off will at first decrease in depth it will soon rise within the cell, and that proportional to its rise the fluid within the supply-cell decreases and lowers in depth.

In my application for Letters Patent filed on or about August 2, 1888, and serially numbered 281,829, I have shown and described a three-cell battery having the positive electrode in one cell and the negative electrode divided into two parts, electrically connected together, and respectively arranged in one and the other of the two remaining cells, and in connection with said arrangement I have in my said application provided a fume-conducting passage consisting of a tube leading from a cell containing one portion of the negative electrode to a cell containing the remaining portion of the negative electrode, whereby said last-mentioned portion of the negative electrode may be subject to the excitant produced by charging some suitable fluid within the cell with the fumes discharged therein.

The arrangement set forth in my said application serves, as in the present case, to prevent the escape of fumes, and likewise to produce an excitant by the discharge of such fumes into a cell; but in this application I desire to cover the principle of a battery provided with a supply-cell wherein water or any other suitable fluid can be charged with fumes generated in a separate cell and discharged into said supply-cell, since I find, as hereinbefore stated, by practical experiment that said supply-cell thus charged does add very materially to the life of the battery, regardless of the fact that no electrode may be present in the supply-cell.

The electrodes herein employed can either be formed as in my said application or they can be formed and arranged in any known or suitable way and be composed of any materials suitable for battery-electrodes.

In the drawing I have shown in vertical central section a galvanic battery involving the principles of my invention. For convenience I have represented said battery as involving substantially the construction and arrangement shown in my said application, with the exception, however, that the central cell does not contain an electrode. The principal parts of said battery may therefore be briefly described as follows:

A indicates the battery-jar, which may be of any desired shape.

B denotes a porous cup arranged within the battery-jar, and C a somewhat smaller porous cup arranged within the cup B, by which said arrangement I provide the cells $a$, $b$, and $c$. The cell $a$ contains an electrode, D, (preferably the negative electrode,) and a suitable excitant, and the cell $b$ contains an electrode, E, (preferably the positive electrode,) and a suitable excitant. The cell $c$, which I term the "supply-cell," contains a fluid which is capable of being charged with fumes from one of the remaining cells, and as a means for conducting fumes into the supply-cell I provide a tube, F, arranged to lead from the upper portion of cell $a$ to the lower portion of cell $c$, whereby fumes will be conducted from the former and discharged into the latter. While various forms of passages could be provided for thus conducting the fumes, the tube herein shown will be found exceedingly convenient. The cells are properly closed, and the electrodes in the cells $a$ and $b$ can be arranged in any desired way.

What I claim as my invention is—

In a galvanic battery, the combination, substantially as hereinbefore set forth, with a couple of cells and suitable electrodes and excitants therein contained, of a third supply-cell, a fume-conducting passage arranged to conduct the fumes from one of said cells and discharge the same into the supply-cell, and a fluid contained within the supply-cell and capable of being charged by said fumes, for the purpose described.

EBEN D. CROSS.

Witnesses:
CHAS. G. PAGE,
E. E. MASSON.